March 18, 1947.  K. J. STIEFEL  2,417,452

ELECTRICAL SYSTEM

Filed Jan. 17, 1944  3 Sheets—Sheet 1

INVENTOR.
KARL J. STIEFEL,
BY Elmer J. Gorn
ATTY.

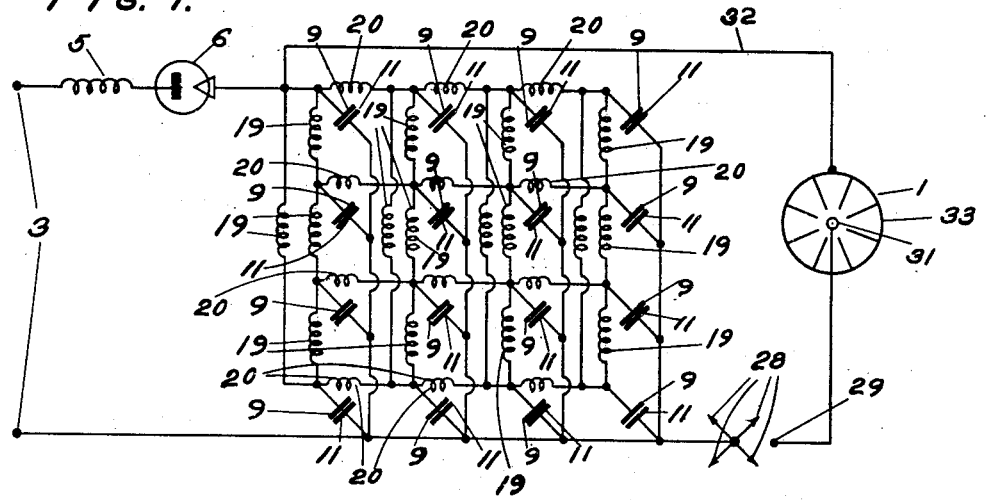
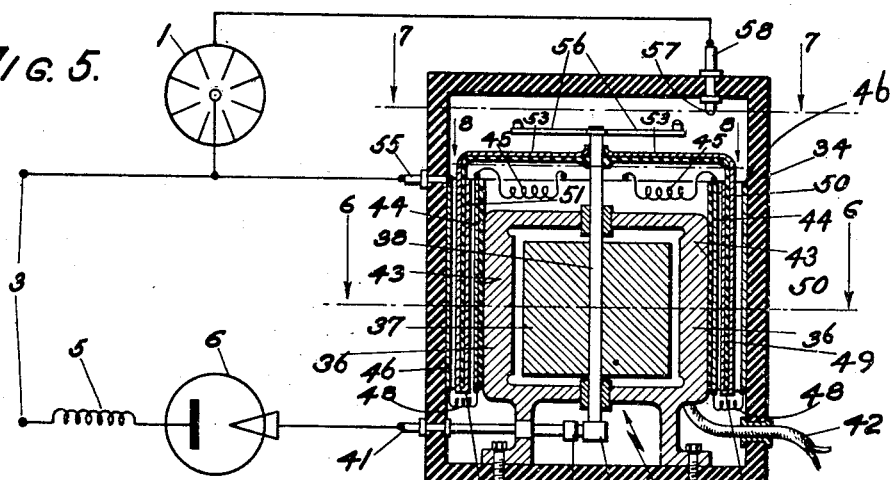
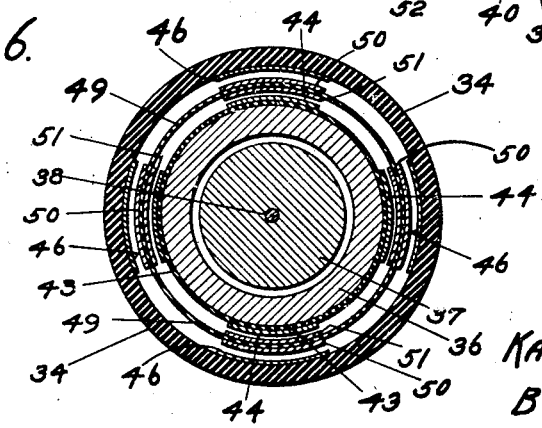

March 18, 1947. K. J. STIEFEL 2,417,452
ELECTRICAL SYSTEM
Filed Jan. 17, 1944 3 Sheets-Sheet 3
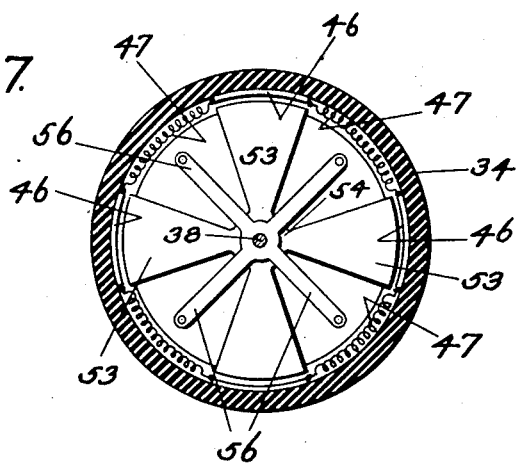
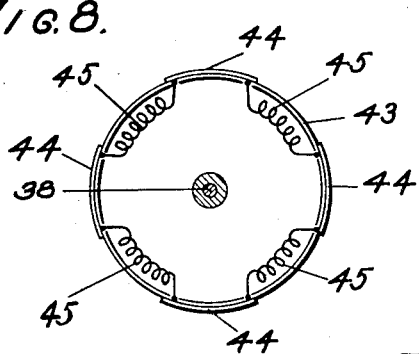
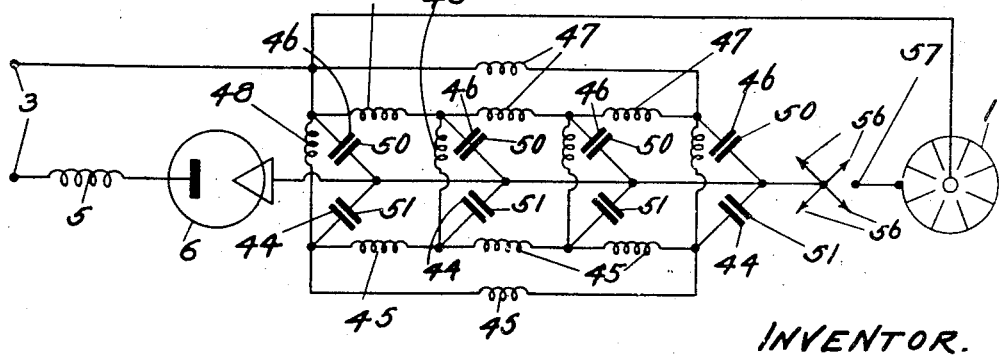
INVENTOR.
KARL J. STIEFEL,
BY Elmer J. Gorn
ATTY.

Patented Mar. 18, 1947

2,417,452

UNITED STATES PATENT OFFICE 2,417,452

ELECTRICAL SYSTEM

Karl J. Stiefel, Waltham, Mass., assignor to Raytheon Manufacturing Company, Newton, Mass., a corporation of Delaware Application January 17, 1944, Serial No. 518,653

10 Claims. (Cl. 171—97)

This invention relates to an electrical system for producing pulses of electrical power of short duration and of relatively high power, and more particularly to such a system in which the pulses are derived by periodically charging and discharging a condenser. In systems of this kind the condenser is charged to a high voltage of the order of twenty thousand to thirty thousand volts, for example. All of the power which is stored in the condenser has been supplied from a charging source which must deliver the necessary power to the condenser at this high voltage. This imposes a severe burden on the source, particularly since such source usually involves a rectifier tube system. Thus, such arrangements have necessitated the use of complicated and expensive power supply sources capable of meeting the foregoing severe requirements.

An object of this invention is to devise a system of the above general type in which the power and voltage which the condenser charging system is called upon to deliver are substantially reduced.

Another object is to deliver energy to the condenser only partially from the charging system and to supply the rest of the energy to the condenser in the form of mechanical energy.

In such systems it is also desirable to produce a pulse having a substantially rectangular wave form. Therefore, another object of this invention is to devise such a system in which such a rectangular wave shape is approximated much more closely than in the prior systems.

A further object of this invention is to devise systems of the foregoing nature which are of a simple, compact and reliable structure.

The foregoing and other objects of this invention will be best understood from the following description of exemplifications thereof, reference being had to the accompanying drawings wherein:

Fig. 4 is a circuit diagram of the arrangement as shown in Fig. 1;

Fig. 5 is a view similar to Fig. 1 of another embodiment of the present invention;

Fig. 6 is a cross-section taken along line 6—6 of Fig. 5;

Fig. 7 is a cross-section taken along line 7—7 of Fig. 5;

Fig. 8 is a cross-section taken along line 8—8 of Fig. 5; and

Fig. 9 is a circuit diagram of the arrangement as shown in Fig. 5.

Figure 1:
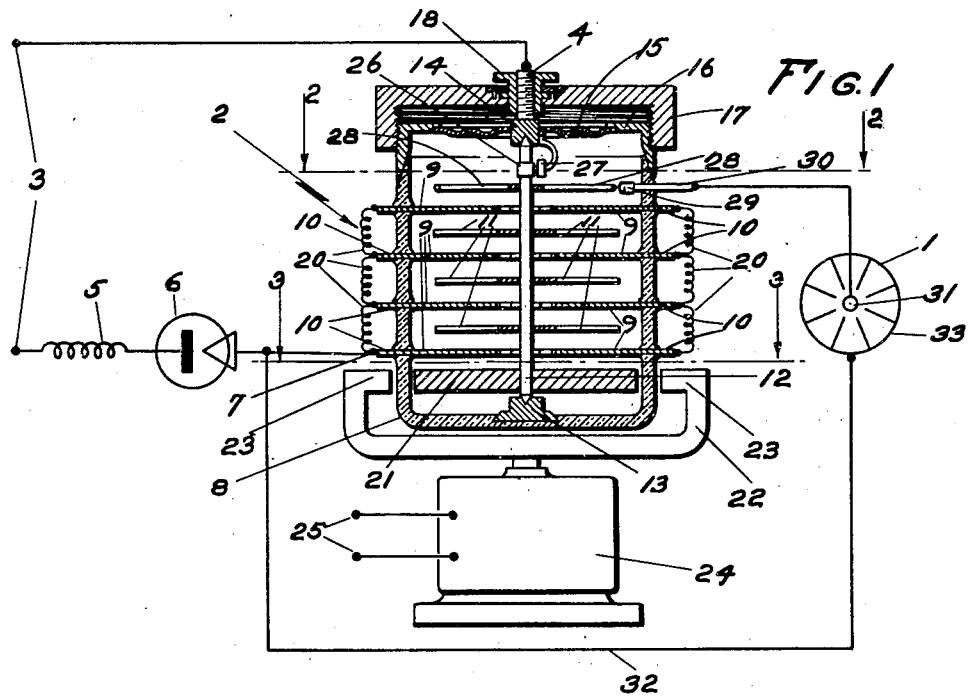
Fig. 1 is a diagram of one form of the invention showing the condenser assembly in cross-section.

In the arrangement shown in Figs. 1-4, pulses of current each of substantially rectangular wave shape are to be supplied periodically to a load 1 which may be, for example, a magnetron oscillator. Each pulse is produced by the discharge of a condenser energy storage assembly 2. The charging current for the condenser 2 is supplied from a pair of terminals 3 which are adapted to be connected to a suitable source of current. This source may constitute either an alternating current or a direct current source. One of the terminals 3 is directly connected to a contact terminal 4 on the condenser assembly 2. The other terminal 3 is connected through a choke 5 in series with a rectifier tube 6 to another contact terminal 7 on the condenser assembly 2. If a direct current source is connected between the terminals 3 it is polarized so that the positive pole thereof is connected to the lead which extends to the anode of tube 6, whereby said tube tends to conduct current from said source to charge the condenser assembly. If an alternating current source is used the rectifier 6 will ordinarily conduct during each alternate half cycle thereof.

The condenser assembly 2 comprises a sealed envelope 8 whose walls are composed of a suitable insulating material, such as glass. Through the walls of the envelope 8 are sealed a plurality of condenser plates 9. These plates are spaced from each other so as to provide between each pair of plates a segmental opening of substantially the same size and shape as an adjacent condenser plate 9. Each of the plates 9 has an exterior portion 10 to which an external electrical connection may be made. The contact terminal 7 may be connected to one of the external portions 10. It will be noted that in the example shown the condenser plates 9 are arranged in four horizontal sets, the plates of each horizontal set being aligned with the plates of each of the other horizontal sets. Furthermore, each horizontal set consists of four condenser plates 9 equally spaced from each other, as explained above. The condenser assembly 2 also is provided with a rotor member comprising a plurality of condenser rotor plates 11. Each of these condenser rotor plates 11 is interposed between two adjacent horizontal sets of the condenser stator plates 9. Each of the condenser plates 11 has a plurality of sector shaped arms corresponding in size, number and spacing to the condenser plates 9 in each of the above-mentioned horizontal sets. The condenser plates 11 are supported on a shaft 12 with their segmental arms in alignment with each other. As the condenser plates 11 rotate, these arms alternately are aligned with the condenser plates 9 and then with the spaces between each pair of condenser plates 9.

The shaft 12 is rotatably supported in bearings 13 and 14. The bearing 13 may be supported by being fused into the lower wall of the envelope 8. The bearing 14 is hermetically sealed to the center of a flexible diaphragm 15 which in turn is sealed in a central opening in a cap member 16. This cap member is sealed in the upper end of the envelope 8 and constitutes the upper wall of said envelope. In this way the envelope 8 is hermetically sealed so that the interior thereof may be filled with a gas, preferably at a high pressure of the order of several atmospheres, to provide a proper dielectric material between the condenser plates 9 and 11. The gas pressure is sufficiently high and the condenser plates 9 and 11 are spaced a sufficient distance from each other so that breakdown of the gaseous medium between the condenser plates 9 and 11 does not occur at the maximum voltage impressed upon the condenser. An auxiliary thrust member 17 is threaded on to the exterior of the cap member 16. The auxiliary member 17 is provided with a central opening in which is journaled an adjusting member 18. The bearing member 14 carries the externally threaded contact terminal 4. The externally threaded portion of the contact terminal 4 is received in a threaded opening extending centrally through the adjusting member 18. Thus, as the adjusting member 18 is rotated the position of the bearing 14 is correspondingly adjusted so as to maintain a proper pressure on the ends of the shaft 12. In this way variations which otherwise might occur, due to temperature and external pressure changes, can be compensated for.

Figure 2:
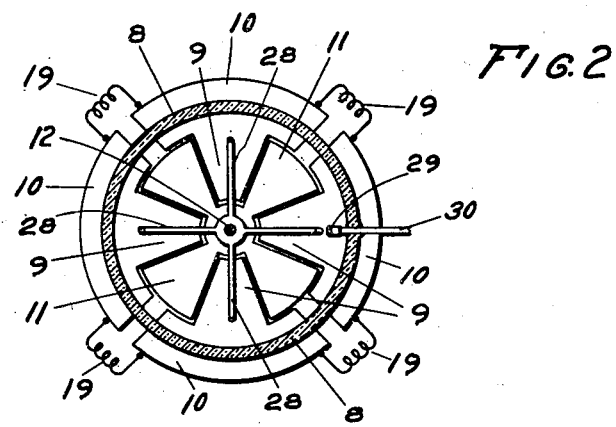
Fig. 2 is a cross-section taken along line 2—2 of Fig. 1.
Figure 3:
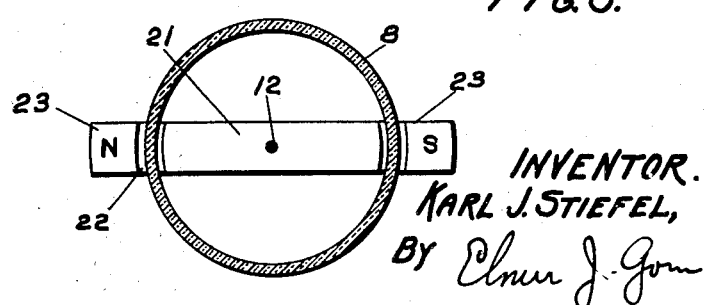
Fig. 3 is a cross-section taken along line 3—3 of Fig. 1.

In order to connect the condenser plates 9 in a proper network, each of these plates is connected to the adjacent plate in its horizontal set by an induction coil 19 (Fig. 2). Likewise each condenser plate 9 is connected to its adjacent vertically aligned condenser plate 9 by an induction coil 20 (Fig. 1).

In order to rotate the condenser rotor the shaft 12 carries a magnetic armature 21, the ends of which are spaced a distance from the lower inside walls of the envelope 8. Outside of the envelope 8 is disposed a driving magnet 22 having its poles 23 disposed adjacent the ends of the armature 21. A motor 24 drives the magnet 22 at the desired rotational speed. The motor 24 may be energized by a pair of leads 25 connected to a suitable source of current. It will be seen that as the motor 24 rotates the magnet 22, the magnetic armature 21 will likewise be driven by the magnetic coupling which exists between it and said magnet. In this way the shaft 12, carrying the condenser plates 11, will be rotated.

In order to secure a good electrical contact with the condenser rotor, the shaft 12 carries a contact ring 26 upon which bears a contact brush 27 supported by and electrically connected to the bearing 14 and its associated contact terminal 4.

It is intended that the condenser system shall be discharged at the time when the condenser plates 11 are aligned with the openings between the condenser plates 9. For this purpose the shaft 12 also carries a plurality of distributor arms 28 corresponding in number to the number of openings between the horizontal condenser plates 9, with each aligned so as to lie between two of the arms of a condenser plate 11. A sparking electrode 29 is supported by a lead-in conductor 30 sealed through the wall of the envelope 8. The sparking electrode 29 is placed over the center of one of the condenser plates 9 and is located so that the end of each distributor arm 28 passes said sparking electrode 29 with a very small spacing therefrom, as the shaft 12 rotates. This spacing is sufficiently close so that the gap between each distributor arm and the sparking electrode 29 breaks down and permits the condenser assembly to discharge each time a distributor arm 28 passes the sparking electrode 29. The lead-in conductor 30 is connected to one of the electrodes of the magnetron 1, for example, its cathode 31. A conductor 32 connects the other electrode of the magnetron 1, for example its anode 33, to the contact terminal 7.

The operation of the arrangement as described above is substantially as follows. We may assume that the condenser plates 11 and 9 are in alignment and that the terminals 3 are energized with voltage of the proper polarity so as to supply charging current to the condenser assembly. The voltage of the source may be of a suitably high value, for example, of the order of 3000 volts. Thereupon a charging current will flow through the choke 5 and the rectifier 6 to the condenser assembly. Due to the action of the choke 5 in storing energy in its magnetic field during the building up of the charging current and delivering said energy to the condenser during the decay of the charging current, the condenser assembly will be charged substantially to double the voltage of the source, for example, to a voltage of the order of 6000 volts. As the charging current falls to zero, the rectifier tube 6 stops conducting current and therefore disconnects the condenser from the charging system until said condenser is subsequently discharged. The time constant of the charging system is such that the above described charging is completed when the condenser plates 11 and 9 are substantially in alignment with each other. When the condenser plates 11 move away from the condenser plates 9 to a position of alignment with the openings between said condenser plates 9, work is done against the force of the electrical field existing between the plates 11 and 9, which force tends to move said plates toward each other. The work thus done manifests itself as an increase in the voltage on the condenser and a corresponding increase in the energy stored therein.

The nature of the above increase will be more clearly understood from the following considerations. Separating the plates of a condenser decreases the capacity of the condenser proportionately to the separation. The voltage E across a capacity C can be expressed as $$E = \frac{Q}{C}$$

where Q is the quantity of electricity stored in the capacity. Since separating the plates of a condenser does not change the quantity of electricity stored therein, it will be seen that the voltage across the condenser increases proportionately as the capacity decreases. The energy W stored in a condenser can be expressed as $$W = \frac{CE^2}{2}$$

From the above it can be shown that the energy stored in the condenser increases proportionately with the decrease in the capacity. In a practical case the final capacity can be decreased to about one quarter of the initial capacity. This will cause the final voltage to rise to four times the initial voltage and the final energy stored in the condenser will be four times the initial energy supplied thereto by the charging circuit. This means that the motor 24 will supply three fourths of the final total energy stored in the condenser, while the power supply 3—3 will supply only one fourth of that energy. In the particular example as cited above, of the voltages involved, the final voltage across the condenser assembly will be of the order of 24,000 volts.

As pointed out above the distributor arms 28 are arranged so as to cause the gap between each of the said arms and the sparking electrode 29 to break down when the condenser plates 11 are aligned with the openings between the condenser plates 9. Thus, this breakdown and discharge of the condenser will occur each time the maximum voltage across the condenser is reached during each rotation of the condenser rotor. Upon each such discharge the condenser will supply a pulse of current of comparatively short duration, but of relatively high power to the load 1. After each discharge of the condenser the rectifier 6 will again start to conduct current and connect the condenser 2 to the source so as to again charge said condenser to its initial value. As pointed out above the time constants of the charging system are such that the charging of the condenser is completed when the plates 9 and 11 are again in alignment with each other. Thus, in the example illustrated the voltage across the condenser 12 rises and falls four times during each revolution of the condenser rotor and thus four distributor arms 28 will be provided to produce four discharge pulses through the load 1.

From the above it will be seen that the power supply connected to the terminals 3—3 need deliver only a fraction of the voltage and power required by the device. Thus such an arrangement relieves the power supply of the conditions previously imposed upon it and thus enables the use of a much simpler and more reliable arrangement than has heretofore been practicable.

As previously indicated, it is desirable that the wave shape of the current pulse supplied to the load 1 be substantially rectangular. The combination of individual condensers and inductances of the condenser assembly 2 comprises a pulse line. If a pulse line comprises a plurality of sections each consisting of a pair of condensers connected across the line with an inductance interposed in one of the lines between said condensers, the wave shape derived from such a line would become more nearly rectangular as the number of said sections increased. Ordinarily the complexity of structure and size involved in securing a large number of such sections are so great that the art has heretofore resorted to only a few pulse line sections with a consequent sacrifice in the wave shape. However, as shown by the circuit diagram in Fig. 4 the arrangement illustrated in Fig. 1 produces, in a comparatively small space, a large number of pulse line sections arranged in a complex network. A pulse line of this type produces a pulse wave shape which almost perfectly approximates a rectangle. It will be seen that this effect is independent of the rotation of the condenser rotor. Thus a construction of this type could also be used in a fixed condenser to secure the advantages of an improved pulse wave shape.

The arrangement as described above lends itself not only to a system in which a gas dielectric is used, but also to one in which the space between the plates 11 and 9 is a high vacuum. In such an arrangement the interior of the envelope 8 would be highly evacuated. However, in such an arrangement by properly configuring and spacing the distributor arms 28 from the sparking electrode 29, a discharge can be made to occur between said members in a vacuum whenever an arm 28 passes the electrode 29.

Another form of this invention is illustrated in Figs. 5 to 9, which form lends itself particularly to a system for producing a large number of short impulses having a high repetition rate. In Figs. 5-9, the same reference numerals are applied as in Figs. 1-4 where the elements are identical. In Figs. 5-9, the entire pulsing system, including the driving motor, is entirely enclosed within a casing 34 of some suitable insulating material. Spaced within this casing is a motor 35 comprising a stator 36 and a rotor 37 mounted upon a shaft 38. The shaft 38 is made of a good conducting material to which electric contact is insured by a contact ring 39 carried by the shaft 38 and engaged by a brush 40. The brush 40 is carried by the stator 36 and connected to a terminal 41 sealed through the wall of the casing 34. The motor 35 may be supplied with current through a cable 42 likewise sealed through the wall of the casing 34. Mounted on the outside of the stator 36 is an insulating sleeve 43. Secured to the outer surface of this insulating sleeve are a plurality of condenser plates 44 in the form of longitudinally disposed conducting strips. Each condenser plate 44 is spaced from its adjacent condenser plate 44 by a distance substantially equal to the width of one of said condenser plates. The condenser plates 44 are connected to each other by a plurality of induction coils 45. A plurality of similar condenser plates 46 are secured to the inside of the casing 34. Each condenser plate 46 is disposed opposite one of the condenser plates 44. The condenser plates 46 are likewise connected to each other by a plurality of induction coils 47. Each condenser plate 46 is likewise connected to its adjacent condenser plate 43 by an inducttion coil 48. The condenser plates 43 and 46 form the stator of a rotating condenser, an annular space existing between said condenser plates in which the rotor of said condenser is adapted to rotate. The condenser rotor comprises a cup 49 of insulating material. On the outside walls of the cup 49 are secured a plurality of condenser plates 50 likewise comprising longitudinal strips spaced from each other as described in connection with the plates 44. On the inside walls of the insulating cup 49 are secured similar condenser plates 51, each plate 51 being located adjacent one of the condenser plates 50. Each pair of condenser plates 50 and 51 are connected to each other over the lower end of the cup 49 by a connector 52. The condenser plates 50 and 51 correspond in size, number and spacing to the condenser plates 44. Each condenser plate 50 is connected by a connector 53 extending over the top of the cup 49 to a central hub connector 54 which is in turn electrically connected to the shaft 38. One of the condenser plates 46 is electrically connected to a lead-in terminal 55 sealed through the wall of the casing 34. A convenient way to form the condenser plates described above is to plate the material forming said plates on to the surface of the insulating walls. The rotating condenser arrangement is here likewise provided with a plurality of distributor arms 56 carried by and electrically connected to the shaft 38. These distributor arms are each located between two of the condenser plates 50. A sparking electrode 57 is carried by a lead-in terminal 58 sealed through the upper wall of the casing 34. This sparking electrode 57 is located along a radius which passes through one pair of condenser plates 44 and 46. The distributor arms 56 are spaced from the sparking electrode 57, as described in connection with the arrangement of Fig. 1, so as to produce a discharge between a distributor arm 52 and the sparking electrode 57 each time said distributor arm passes adjacent said sparking electrode. In this case likewise the casing 34 is filled with a gas, preferably at high pressure, as described in connection with Fig. 1.

The operation of the system, as illustrated in Figs. 5–9, is substantially identical to that described in connection with the embodiment illustrated in Figs. 1–4. In this second embodiment the condenser assembly likewise constitutes a complex pulse line network as shown by the circuit diagram in Fig. 9. Here likewise the pulse line will deliver a pulse having a wave shape which closely approximates a rectangle. Although this embodiment has been illustrated with four condenser sections, it is to be understood that such an arrangement is adapted for the use of a considerably large number of such condenser sections in order to obtain a rapid repetition rate of pulsing. One example of an arrangement of this kind might consist of a high speed motor operating at 12,000 R. P. M., and a condenser having six sections. Under these conditions 1200 pulses per second would be delivered to the load.

Of course it is to be understood that this invention is not limited to the particular details as described above as many equivalents will suggest themselves to those skilled in the art. It is accordingly desired that the appended claims be given a broad interpretation commensurate with the scope of the invention within the art.

What is claimed is:

1. An electrical system comprising a condenser comprising a condenser element having a plurality of circularly disposed arms, another condenser element having a plurality of arm sections disposed concentrically around said first condenser element, said arm sections being spaced from each other to form intervening spaces, said condenser elements being relatively rotatable to cause said arms alternately to be aligned with said arm sections and with said spaces, means for charging said condenser to a predetermined voltage when said arms and arm sections are in alignment, means for rotating said condenser elements with respect to each other, and means for discharging said condenser when said arms and arm elements are out of alignment with each other.

2. An electrical energy storage system comprising a condenser element having a plurality of circularly disposed arms, and another condenser element having a plurality of arm sections disposed concentrically around said first condenser element, each of said arm sections being connected to an adjacent arm section by an inductance.

3. An electrical energy storage system comprising a condenser element having a plurality of circularly disposed arms, and a plurality of additional condenser elements each having a plurality of arm sections disposed concentrically around said first condenser element, each of said arm sections being connected to an adjacent arm of its condenser element section by an inductance, each of said arm sections also being connected to an arm section of another of said condenser elements by an inductance.

4. An electrical system comprising a condenser comprising a condenser element having a plurality of circularly disposed arms, said condenser element being adapted to rotate about an axis, said arms being disposed substantially parallel to said axis, another condenser element having a plurality of arm sections disposed concentrically around said first condenser element and substantially parallel to said arms, said arm sections being spaced from each other to form intervening spaces, means for rotating said condenser elements with respect to each other to cause said arms alternately to be aligned with said arm sections and with said spaces, and means for discharging said condenser when said arms and arm elements are out of alignment with each other.

5. An electrical pulse-forming system comprising: at least two parallel connected condensers; an inductor connected in series with each adjacent pair of said condensers; means for charging said condensers to a predetermined voltage; means for decreasing the capacitance of said condensers after they have been charged, and thereby increase the voltage across the same; and means for discharging said condensers after said capacitance has been decreased to a predetermined minimum value.

6. An electrical pulse-forming system comprising: at least two parallel connected condensers, each of which includes a fixed plate and a movable plate; an inductor connected in series with each adjacent pair of said condensers; means for charging said condensers to a predetermined voltage; means for moving said condenser plates relative to each other to decrease the capacitance of said condensers after they have been charged, and thereby increase the voltage across the same; and means for discharging said condensers after said capacitance has been decreased to a predetermined minimum value.

7. An electrical pulse-forming system comprising: at least two parallel connected condensers, each of which includes a fixed plate and a movable plate; each such fixed plate consisting of a plurality of plate sections connected by inductors, and each such movable plate consisting of a plurality of connected plate arms cooperable, respectively, with said plate sections; an inductor connected in series with each adjacent pair of said condensers; means for charging said condensers to a predetermined voltage; means for moving said condenser plates relative to each other to decrease the capacitance of said condensers after they have been charged, and thereby increase the voltage across the same; and means for discharging said condensers after said capacitance has been decreased to a predetermined minimum value.

8. An electrical pulse-forming system comprising: at least two parallel connected condensers; an inductor connected in series with each adjacent pair of said condensers; means for periodically charging said condensers to a predetermined voltage; means for decreasing the capacitance of said condensers after they have been charged, and thereby increase the voltage across the same; and means operating in synchronism with said capacitance-decreasing means for discharging said condensers after said capacitance has been decreased to a predetermined minimum value.

9. An electrical pulse-forming system comprising: at least two parallel connected condensers, each of which includes a fixed plate and a movable plate; an inductor connected in series with each adjacent pair of said condensers; means for periodically charging said condensers to a predetermined voltage; means for moving said condenser plates relative to each other to decrease the capacitance of said condensers after they have been charged, and thereby increase the voltage across the same; and means operating in synchronism with said plate-moving means for discharging said condensers after said capacitance has been decreased to a predetermined minimum value.

10. An electrical pulse-forming system comprising: at least two parallel connected condensers, each of which includes a fixed plate and a movable plate; each such fixed plate consisting of a plurality of plate sections connected by inductors, and each such movable plate consisting of a plurality of connected plate arms cooperable, respectively, with said plate sections; an inductor connected in series with each adjacent pair of said condensers; means for periodically charging said condensers to a predetermined voltage; means for moving said condenser plates relative to each other to decrease the capacitance of said condensers after they have been charged, and thereby increase the voltage across the same; and means operating in synchronism with said plate-moving means for discharging said condensers after said capacitance has been decreased to a predetermined minimum value.

KARL J. STIEFEL.

REFERENCES CITED

The following references are of record in the file of this patent:

UNITED STATES PATENTS

| Number | Name | Date |
|---|---|---|
| 1,559,656 | Thorp | Nov. 3, 1925 |